United States Patent Office 3,450,399
Patented June 17, 1969

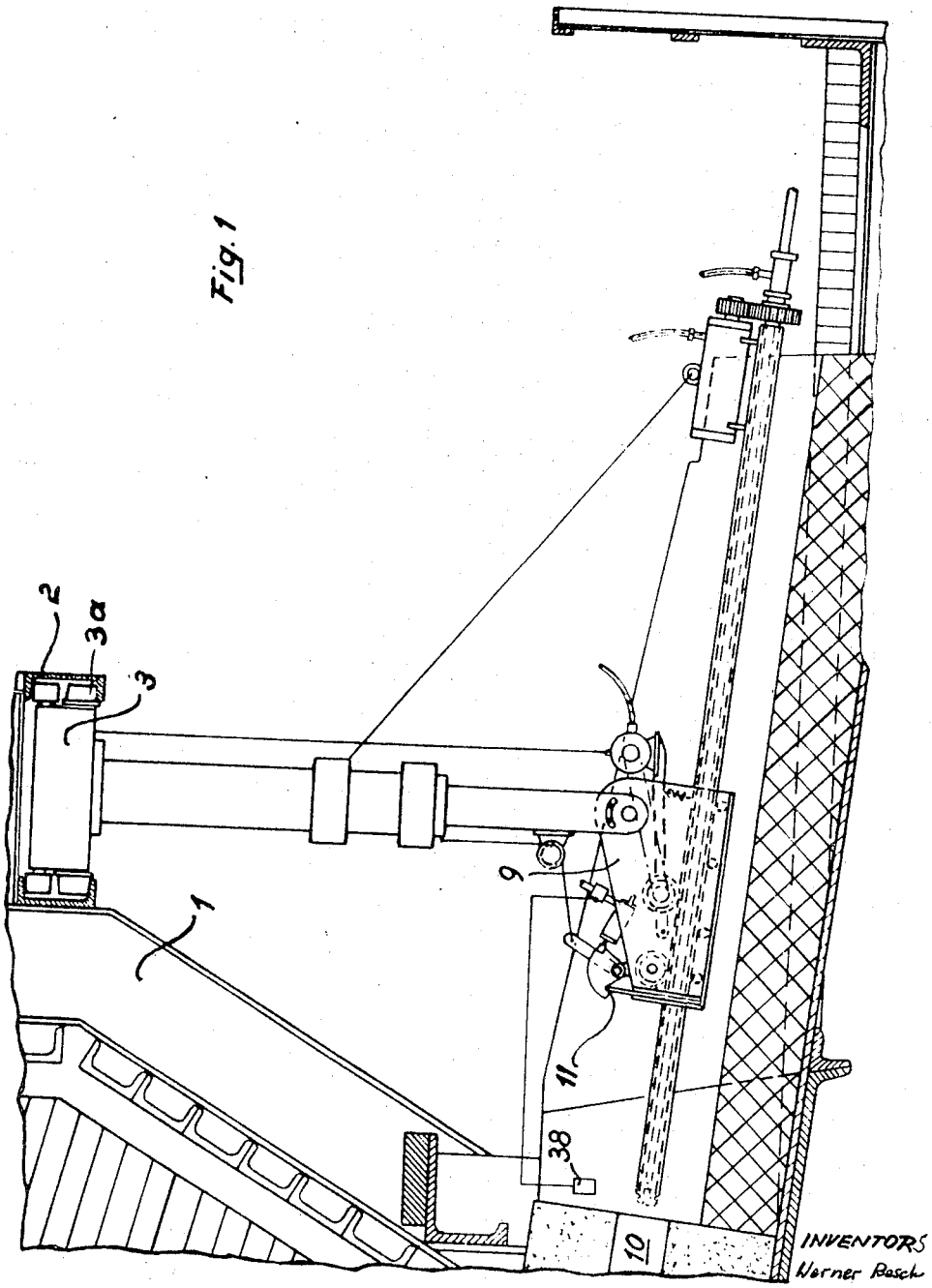

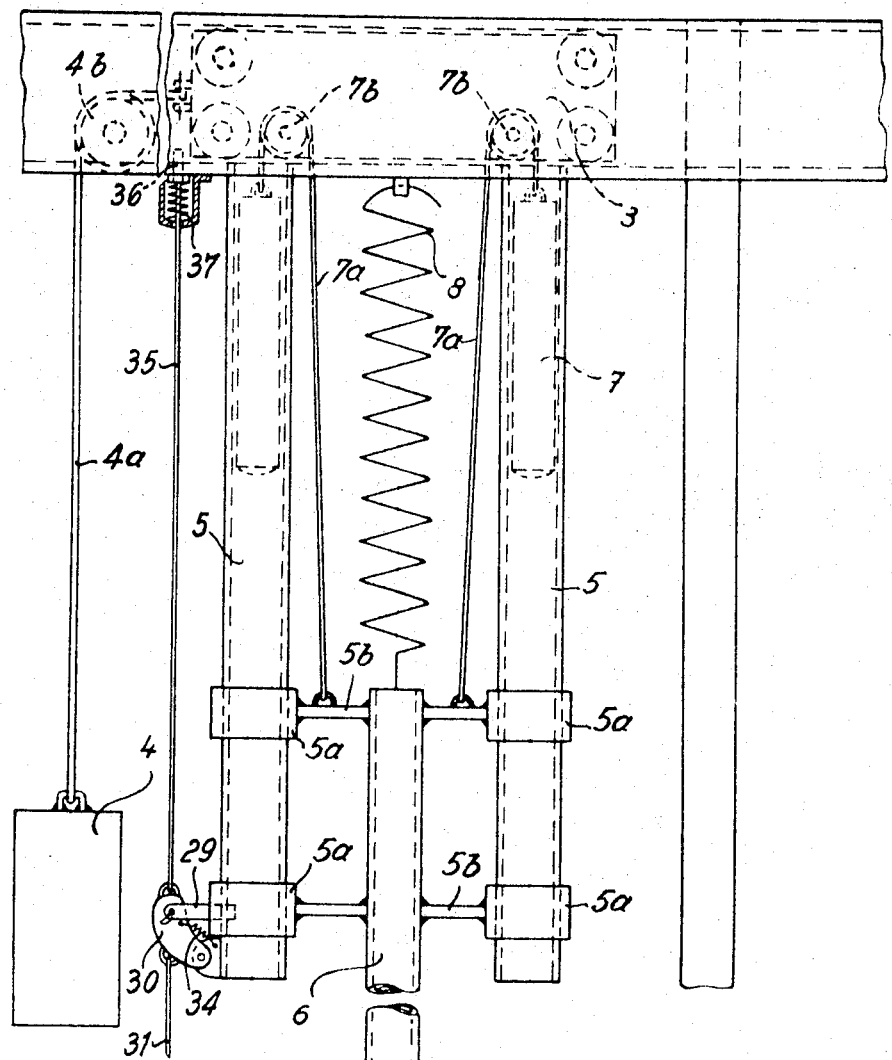
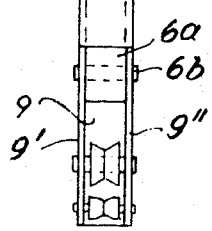

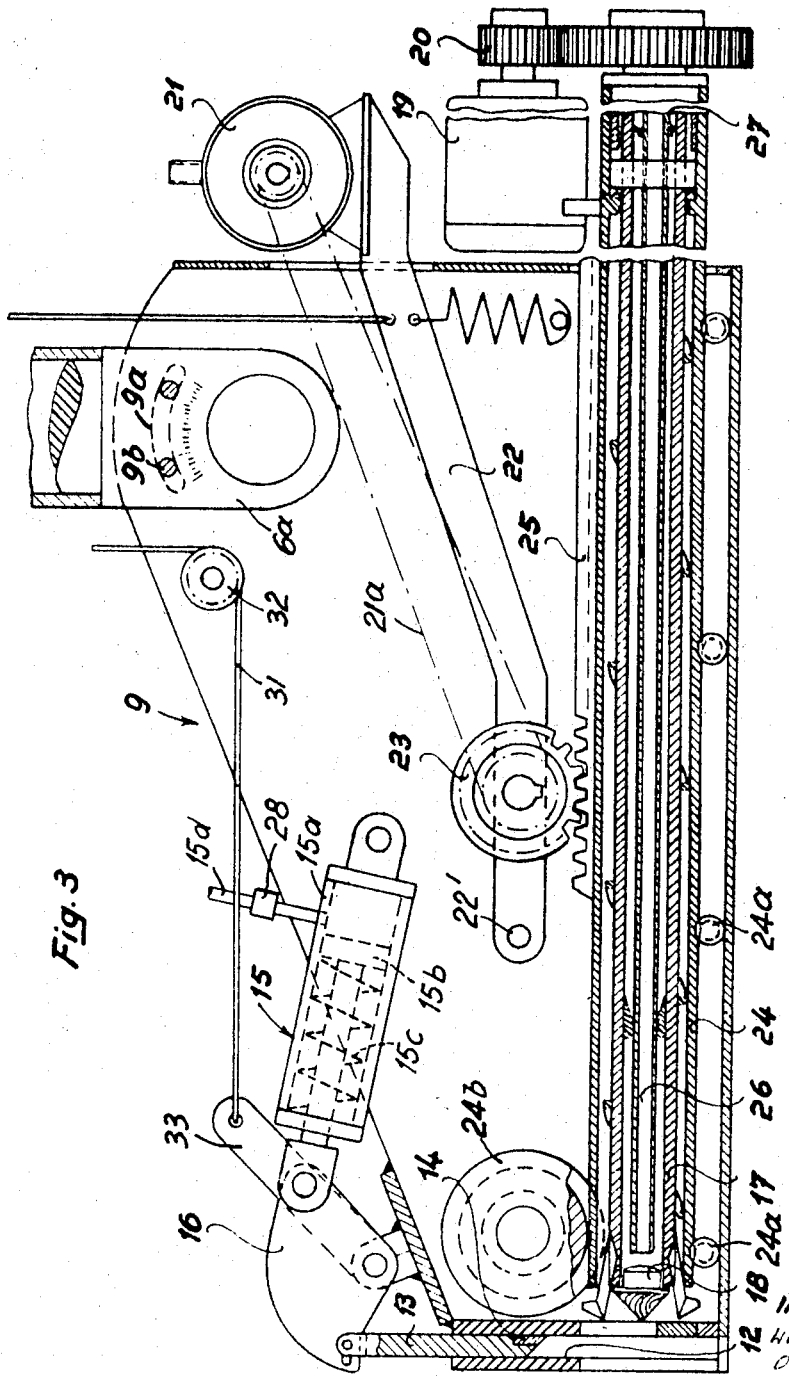

3,450,399
APPARATUS FOR FORMING A TAP HOLE INCLUDING BORING TOOL, BLOWPIPE AND BLOWPIPE CUTOFF MEANS
Werner Resch, Dortmund-Kirchhoerde, and Oskar Fliege, Dortmund, Germany, assignors to Hoesch Aktiengesellschaft, Dortmund, Germany
Filed June 9, 1966, Ser. No. 556,506
Claims priority, application Germany, June 11, 1965,
H 56,282
Int. Cl. C21b 7/12
U.S. Cl. 266—42          10 Claims

ABSTRACT OF THE DISCLOSURE

An apparatus for forming a tap hole in a wall portion of a metallurgical furnace in which the tap hole is prebored to a predetermined depth by mechanical boring means and in which the remainder of the tap hole is burned through by means of an oxygen blowpipe.

---

In many cases the tap hole is prebored to a predetermined depth either by hand or by an appropriate boring machine and the remainder of the tap hole is burned through by means of an oxygen blowpipe.

In carrying out this operation as known in the art, the operator handling the blowpipe has to stand laterally of the tap hole and at a considerable distance from the outer end thereof so that it is extremely difficult for him to guide the blowpipe coaxial with the prebored portion of the tap hole. This may result that the final portion of the tap hole will be located inclined to the theoretical axis thereof, which in turn may result in damage of the wall portion of the furnace about the tap hole by the hot molten metal emanating therefrom. In addition there is the danger that the blowpipe is introduced too far into the furnace in direction inclined to the axis of the tap hole so that damage of the furnace wall about the tap hole during the burning operation may result. In addition, in carrying out such a method there is always the danger that the operator may be injured by the stream of molten metal emanating from the opened tap hole, especially when the steam of metal impinges on the blowpipe.

In order to overcome these disadvantages, methods and boring apparatus have already been developed in which opening of the tap hole is carried out only by mechanical means which may even be remotely controlled so that the tap hole will be formed always and over its whole length at the same exactly adjusted angle. The forming of the tap hole is in this case carried out in two steps, in the first step the tap hole is bored out to a predetermined depth, whereas during the second step the remainder of the tap hole is formed by a percussion drill.

This known apparatus is not very well suited for the forming of tap holes in open hearth furnaces, especially in Siemens-Martin ovens, since in such furnaces the final opening of the tap hole is in the most cases only possible by means of an oxygen blowpipe. The aforementioned apparatus has also the disadvantage that the second tool has to be moved, after the tap hole has been completely opened and the molten steel emanates in a stream therefrom, at least through the length of the tap hole in direction of the emanating stream of molten steel and that only after the second tool has been withdrawn in this direction, the whole machine may be moved in direction transverse to the stream of emanating steel out of the influence of the latter. During the time of withdrawal of the second tool in axial direction the machine is subjected to the influence of the hot molten steel emanating from the opened tap hole so that damage to the tool and to the machine are hardly avoidable and so that replacement of the second tool and/or repair of the machine will become necessary after only a few operations.

This known apparatus has therefore also not worked out to full satisfaction, especially since in modern furnaces the periods between successive tapping of the furnaces are considerably reduced so that methods and apparatus for forming the tap holes without damage to the apparatus become of increasing importance.

It is an object of the present invention to provide for an apparatus for forming tap holes in a furnace which avoids the above-mentioned disadvantages of apparatus known in the art.

It is an additional object of the present invention to provide for an apparatus for forming tap holes in a furnace in which the danger of damaging the apparatus by the hot metal emanating from the tap hole is reduced to a minimum.

It is a further object of the present invention to provide an apparatus for forming a tap hole in a furnace by preboring the tap holes first to a predetermined depth and by burning out the remainder of the tap hole by an oxygen blowpipe and in which the apparatus may be moved in direction transverse to the stream of hot metal emanating from the apparatus at the moment the hot metal emanates from the furnace.

With these objects in view the apparatus according to the present invention mainly comprises support means, elongated boring means having an axis and being mounted on said support means turnably about its axis and movable in axial direction between an advanced position and a retracted position for boring during its movement to the advanced position a tap hole to a predetermined depth, drive means connected to the boring means for rotating the same about its axis, shifting means connected to the boring means for moving the latter between the advanced and the retracted position thereof, blowpipe means adapted to be connected at one end thereof to a source of oxygen and movably mounted on the support means to extend with an end portion thereof beyond the retracted boring tool into the prebored portion of the tap hole for burning out the remainder of the tap hole, and cutoff means carried by the support means for cutting off the portion of the blowpipe means extending beyond the retracted boring tool means at the moment of completion of the tap hole and discharge of a stream of molten metal therethrough, so that the support means, the boring tool means and the remainder of the blowpipe means may be moved in direction transverse to the stream of molten metal at the moment the latter emanates from the furnace.

Preferably the support means include a working head carrying the boring means and the blowpipe means and the boring means are preferably in the form of an elongated tubular boring tool through which the blowpipe extends substantially coaxial therewith.

The support means preferably include mounting means mounting the working head movable between a working position in which the boring means are located opposite the wall portion of the furnace in which the tap hole is to be formed and in inactive position in which the working head is displaced in a direction transverse to the axis of the boring means relative to the working position. Biasing means are preferably connected to the working head and biased so as to tend to move the latter from the working to the inactive position and the working head is held in the working position by locking means connected thereto. The locking means are movable between a locking position for maintaining the working head against the force of the biasing means in the working position, and a releasing position releasing the working head so that the latter moves under the influence of the biasing means from the working to the inactive position. The apparatus further includes means for moving the locking means from the locking to the releasing position at the moment the cutoff means cut off the front portion of the blowpipe means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic partly sectioned side view of the apparatus of the present invention as mounted on a metallurgical furnace only partly shown in FIG. 1;

FIG. 2 is a front view of the apparatus shown in FIG. 1, with some elements of the apparatus removed for the sake of clarity; and FIG. 3 is a longitudinal cross section through part of the apparatus shown in FIG. 1 drawn to an enlarged scale and showing the boring means in the retracted position thereof.

Referring now to the drawings, and more specifically to FIGS. 1 and 2 of the same, it will be seen that the apparatus according to the present invention comprises support means which preferably include a carriage 3 movably guided by means of rollers 3a in a pair of U-shaped guide rails 2 extending in substantially horizontal direction and being mounted in any convenient manner on a portion of a furnace 1, only partly and schematically illustrated in FIG. 1. The support means include further elongated guide means in form of a pair of tubular members 5 projecting spaced from and parallel to each other downwardly from a bottom wall of the carriage 3 and being connected at the upper ends thereof in any convenient manner, for instance by welding, to the latter. A pair of guide sleeves 5a are arranged spaced from each other on each of the tubular guide members 5 and the guide sleeves 5a are connected by cross bars 5b to an additional tubular member 6 located midway between the pair of tubular members 5 and extending with a lower portion thereof downwardly beyond the lower ends of the tubular members 5, as best shown in FIG. 2. A plug 6a is fixed, for instance by welding, in the lower portion of the tubular member 6, extending with a bottom portion thereof beyond the bottom end of the tubular member and this bottom portion is preferably of square or rectangular cross section. The bottom portion of the plug 6a is formed with a bore extending transverse to the axis of the tubular member 6 and a working head 9 having a pair of side walls 9' and 9" is tiltably mounted on the bottom portion of the plug 6a by means of a pin 6b extending through the aforementioned bore. Each of the side walls of the working head 9 is formed with a curved slot 9a substantially coaxial to the axis of the pin 6b through which screw bolts 9b fixed to the plug 6a extend so that nuts screwed onto opposite ends of the screw bolts may be used for fixing the working head 9 in a desired angular position with respect to the axis of the tubular member 6.

The working head 9 carries between the side walls 9' and 9" thereof elongated boring means movable in axial direction and rotatable about its axis. The elongated boring means comprise, as best shown in FIG. 3, an elongated tubular member 24 guided for movement in axial direction between a plurality of lower guide rolls 24a and an upper guide roll 24b turnably mounted between the side walls of the working head 9. Coaxially arranged within the tubular member 24 and turnable about its axis relative thereto is an elongated tubular boring member 17 formed at the front portion thereof facing the furnace 1 with appropriate cutting portions. During the actual boring operation, the front end of the tubular boring tool 17 is closed by plug 18 removably inserted in the front end thereof. The tubular boring member 17 is rotated about its axis by means of a motor 19 fixedly mounted on the rear end of the tubular member 24 and connected to the rear end of the boring tool 17 by means of a reduction gearing 20. The motor 19 is preferably a motor of known construction operated by compressed air. The tubular member 24 and the tubular boring tool 17 mounted therein for movement in axial direction therewith are advanced in axial direction by means of a rack 25 fixed to an upper portion of the tubular member 24 and meshing with a pinion 23 which is mounted on a rocker arm 22 pivoted at a front end thereof at 22' to the side walls of the working head 9 and carrying at the other end thereof a motor 21 of known construction, preferably driven by compressed air and connected to the pinion 23 by means of a belt or chain drive 21a so as to rotate the latter.

An elongated blowpipe 26 extends substantially coaxial through the interior of the tubular boring tool 17 and is slidably guided therein for movement in axial direction so that the front portion of the blowpipe 26 may, after the plug 18 is removed from the tubular boring tool 17, project beyond the front end of the latter. When the blowpipe 26 is formed from a substantially rigid tube, the latter may be moved in axial direction relative to the tubular boring tool 17 by means of an annular piston 27 fixed to a rear portion of the blowpipe and by compressed air acting on the piston 27.

On the other hand, the blowpipe may be formed from flexible tubing and the rear portion thereof may be wound on a spool and in this case the blowpipe may be advanced by turning the spool about its axis.

The apparatus includes further cutoff means for cutting off the portion of the blowpipe 26 projecting beyond the front end of the boring means 24, 17 when the latter are in the retracted position as shown in FIG. 3. The cutoff means include a cutoff knife 13, guided between a pair of guide plates 12 extending spaced from each other and transverse to the side plates of the working head 9, and being movable between a retracted position, as shown in FIG. 3, in which the cutting edge 14 of the cutting knife 13 is upwardly spaced from the tubular member 24 and a cutoff position in which the cutting edge 14 cuts through the end portion of the blow pipe 26 when the latter projects beyond the front end of the tubular member 24 through the guide plates 12. The cutoff knife 13 is moved between the positions thereof by operating means including cylinder and piston means 15 operated by compressed air and including a cylinder 15a pivotally mounted at one end thereof on the working head 9 and a piston 15b slidably guided in the cylinder 15a and having a piston rod projecting beyond the other end of the cylinder 15a and being pivotally connected to a plate-shaped lever 16 which in turn is pivotally mounted in the manner as best known in FIG. 3 on the working head 9. The end of the lever 16 distant from the end connected to the piston rod of the piston 15b is connected by means of a pin and slot connection to the upper end of the cutoff knife 13, as shown in FIG. 3. The cylinder and piston means 15 may also include a compression spring 15c mounted between the other end of the cylinder 15a and piston 15b in the manner as shown in FIG. 3 and being biased in such a manner so as to yieldably maintain the cutoff knife 13 in the retracted position as shown in FIG. 3. A tube or hose 15d, communicating with the interior of the cylinder 15a in the manner as shown in FIG. 3, serves to feed compressed air into the cylinder so as to move the piston 15b against the force of the compression spring 15c towards the left, as viewed in FIG. 3, to move thereby the cutoff knife 13 from the retracted to the cutoff position thereof. A valve 28 in the tube 15d controls flow of compressed air into and out of the cylinder 15a Biasing means are connected to the working head 9 for moving the latter from a working position in which the boring means 24, 17 are aligned with a portion of the furnace in which the tap hole is to be formed and an inactive position in which the working head is displaced in direction transverse to the axis of the boring means from the working position. The biasing means may include a pair of elongated weights 7 slidably guided in the tubular members 5 and connected by ropes 7a or the like to the transverse bars 5b which connect the guide sleeves 5a to each other. The ropes 7a are preferably guided over rollers 7b turnably carried by the carriage 3, as best shown in FIG. 2. The biasing means may also include a coil tension spring 8 fixed at opposite ends thereof to the carriage 3 and the upper end of the tubular member 6. which supports the action of the weights 7. Likewise, a weight 4 connected by means of a rope 4a or the like and guided over a roller 4b turnably mounted on the guide rails 2 is connected to the carriage 3 so as to tend to move the latter in lateral direction so as to move the parts of the apparatus connected to the carriage 3 in horizontal direction away from a position in which the boring tool carried by the working head 9 is properly located with respect to the furnace 1.

The apparatus includes further locking means cooperating with the guide means or guide sleeves 5a and with the carriage 3 for maintaining the guide sleeves 5a and the part of the apparatus connected thereto as well as the carriage 3 against the force exerted by the biasing means, that is the weights 7 and 4 and the spring 8 in a position in which the boring means carried by the working head of the apparatus are properly aligned with a predetermined wall portion of the furnace. The locking means may include a locking pin 29 extending through appropriate aligned bores of one of the sleeves 5a and the corresponding tubular member 5 and moveable between a locking position as shown in FIG. 2 and a releasing position in which the pin 29 is removed from the bore in the tubular member 5 so that the sleeve 5a is free to move in upward direction under the influence of the biasing means connected thereto. The locking pin 29 is connected by a pin and slot connection to the upper end of a lever 30 pivotally connected at a lower end to a lower portion of the tubular member 5 and moved from the locking position to a releasing position in which the pin 29 is withdrawn from the bore in the member 5 by means of a rope 31 or the like which is guided over a roller 32 mounted on the working head 9 and connected at the end opposite from the lever 30 to a lever 33 which is fixed to the plate-shaped lever 16 for turning with the latter. A spring 34 connected to the lever 30 tends to maintain the locking pin 29 in the locking position thereof. A rope 35 or the like connects the lever 30 to an additional locking pin 36 projecting in the path of the carriage 3 to engage the left end of the latter, as viewed in FIG. 2, to prevent movement of the carrige 3 to the left, as viewed in FIG. 2, under the influence of the weight 4. A spring 37 cooperates with the locking pin 36 tending to maintain the latter in the locking position as shown in FIG. 2.

The apparatus may further include sensing means 38 of known construction arranged in the region of the wall portion of the furnace 1 in which the tap hole 10 is to be formed for sensing hot metal emanating from the tap hole. The sensing means may be in the form of an electric eye or in the form of temperature sensing means and the specific construction of the sensing means used does not form part of the present invention. The sensing means have to be constructed in such a manner so as to instantaneously sense when hot molten metal emanates from the tap hole 10. The sensing means 38 are connected in a known manner to the valve 28 to open the latter for feeding compressed air into the cylinder 15a so as to move the piston 15b in a direction which moves the cutting knife 13 from the retracted to the cutoff position thereof at the moment hot molten metal emanates from the finished tap hole.

The operation of the apparatus above described will be obvious from the description thereof. The angular position of the working head 9 relative to the tubular support thereof is first adjusted by means of the adjusting means 9a, 9b above-described, and the locking pins 29 and 36 are maintained in the engaged position so that the boring means 24, 17 are properly aligned with the wall portion of the furnace 1 in which the tap hole 10 has to be formed. The tubular boring member 17 is then rotated about its axis by means of the motor 19 and the tubular member 24 as well as the tubular boring tool 17 are advanced from the position shown in FIG. 3 so as to engage a wall portion of the furnace 1 in which the tap hole 10 is to be formed and to bore this tap hole to a predetermined depth. The boring means 24, 17 are then retracted, by reversing the motor 21 in a known manner, again to the position shown in FIG. 3 and the plug 18 is removed from the front end of the tubular member 17. The blowpipe 26 is then advanced from the position shown in FIG. 3 to extend through the guide plates 12 and into the prebored portion of the tap hole 10 and the remainder of the tap hole is then burned out by feeding oxygen through the blowpipe 26. When the tap hole 10 is completely opened molten metal in the furnace will emanate therethrough, and the sensing means 38 will sense emanation of molten metal from the tap hole. The sensing means 38, when energized, will open the valve 28 so that the piston 15b is moved from the position shown in FIG. 3 to a position in which the cutoff knife 13 is moved in downward direction to cut off the portion of the blowpipe 26 extending beyond the right guide plate, as viewed in FIG. 3. During the movement of the piston 15b towards the left, as viewed in FIG. 3, the lever 33 connected to the level 16 will turn in counterclockwise direction moving thereby the locking pins 29 and 36 to the releasing position so that the working head 9 is moved under the influence of the biasing means, that is, the weights 7 and the spring 8 in upward direction, whereas the carriage 3 is moved under the influence of the weight 4 towards the left, as viewed in FIG. 2, so that the apparatus is vertically and horizontally moved relative to the stream of molten metal emanating from the tap hole 10.

It will be understood that each of the elements described above, or two or more together, may also find a useful application in other types of apparatus for forming a tap hole in a wall portion of a metallurgical furnace differing from the types described above.

While the invention has been illustrated and described as embodied in an apparatus for forming a tap hole by preboring the tap hole to a predetermined depth and by burning out the remainder of the tap hole, it is not intended to be limited to the details shown, since various modifications and structural changes may be made without departing in any way from the spirit of the present invention.

What is claimed is:

1. Apparatus for forming a tap hole in a wall portion of a metallurgical furnace containing molten metal comprising, in combination, support means; elongated boring means having an axis and being mounted on said support means turnable about its axis and movable in axial direction between an advanced and a retracted position for boring during its movement to said advanced position a tap hole to a predetermined depth; drive means connected to said boring means for rotating the same about its axis; shifting means connected to said boring means for moving the latter between said advanced and said retracted positions; blowpipe means adapted to be connected at one end thereof to a source of oxygen, said blowpipe means being movably mounted on said support means to extend with an end portion thereof beyond the retracted boring tool into said prebored portion of the tap hole for burning out the remainder of said tap hole; and cutoff means carried by said support means for cutting off the portion of said blowpipe means extending beyond the retracted boring tool means at the moment of completion of the tap hole and discharge of a stream of molten metal therethrough so that said support means, said boring tool means and the remainder of said blowpipe means may be moved in direction transverse to the stream of molten metal at the moment the metal emanates from the furnace through the finished tap hole.

2. An apparatus as set forth in claim 1, wherein said support means includes a working head carrying said boring means and said blowpipe means.

3. An apparatus as set forth in claim 2, wherein said boring means is in the form of an elongated tubular boring tool and said blowpipe means extends through said tubular boring tool substantially coaxial therewith.

4. An apparatus as set forth in claim 2, wherein said support means includes mounting means mounting said working head movable between a working position in which said boring means are located opposite said wall portion of said furnace and an inactive position in which said working head is displaced in the direction transverse to the axis of said boring means relative to said working position; biasing means connected to said working head and biased so as to tend to move the latter from said working to said inactive position, locking means connected to said working head and being movable between a locking position for maintaining said working head against the force of said biasing means in said working position and a releasing position releasing said working head so that the latter may move under the influence of said biasing means from said working to said inactive position; and means for moving said locking means from said locking to said releasing position.

5. An apparatus as set forth in claim 4, wherein said cutoff means includes a cutoff knife carried by said working head movably between a retracted position and a cutting position cutting through said front end portion of said blowpipe means, and operating means connected to said cutoff knife for moving the latter between said positions thereof, and wherein said means for moving said locking means from said locking to said releasing position include means connecting said operating means of said cutoff knife to said locking means and being constructed and arranged for moving said locking means to said releasing position when said operating means moves said cutoff knife to said cutting position.

6. An apparatus as set forth in claim 5, wherein said mounting means include a carriage, rail means supporting said carriage for moving in substantially horizontal direction transverse to the axis of said boring means, and elongated guide means extending in substantially vertical direction downwardly from said carriage and guiding said working head for movement in said vertical direction.

7. An apparatus as set forth in claim 6, wherein said biasing means include weight means connected to said working head and constructed and arranged so as to tend to move the latter in upward direction along said guide means.

8. An apparatus as set forth in claim 7, wherein said elongated guide means include at least one elongated tubular member, and sleeve means carrying said working head and guided on said tubular member, said weight means being arranged in said tubular member and slidably guided therein.

9. An apparatus as set forth in claim 6, wherein said biasing means includes weight means connected to said carriage and constructed and arranged so as to tend to move the latter in said horizontal direction.

10. An apparatus as set forth in claim 7, wherein said elongated guide means includes at least one elongated tubular member, and sleeve means carrying said working head and guided on said tubular member, and said weight means being arranged in said tubular member and slidably guided therein, and wherein said biasing means include additional weight means connected to said carriage and constructed and arranged so as to tend to move the latter in said horizontal direction.

References Cited

UNITED STATES PATENTS 3,121,769    2/1964    Horn _____ 266—42

FOREIGN PATENTS 141,168    2/1961    U.S.S.R.

J. SPENCER OVERHOLSER, *Primary Examnier.*

ROBERT D. BALDWIN, *Assistant Examiner.*